L. JAENICHEN.
SPRING SCALE.
APPLICATION FILED SEPT. 18, 1908.

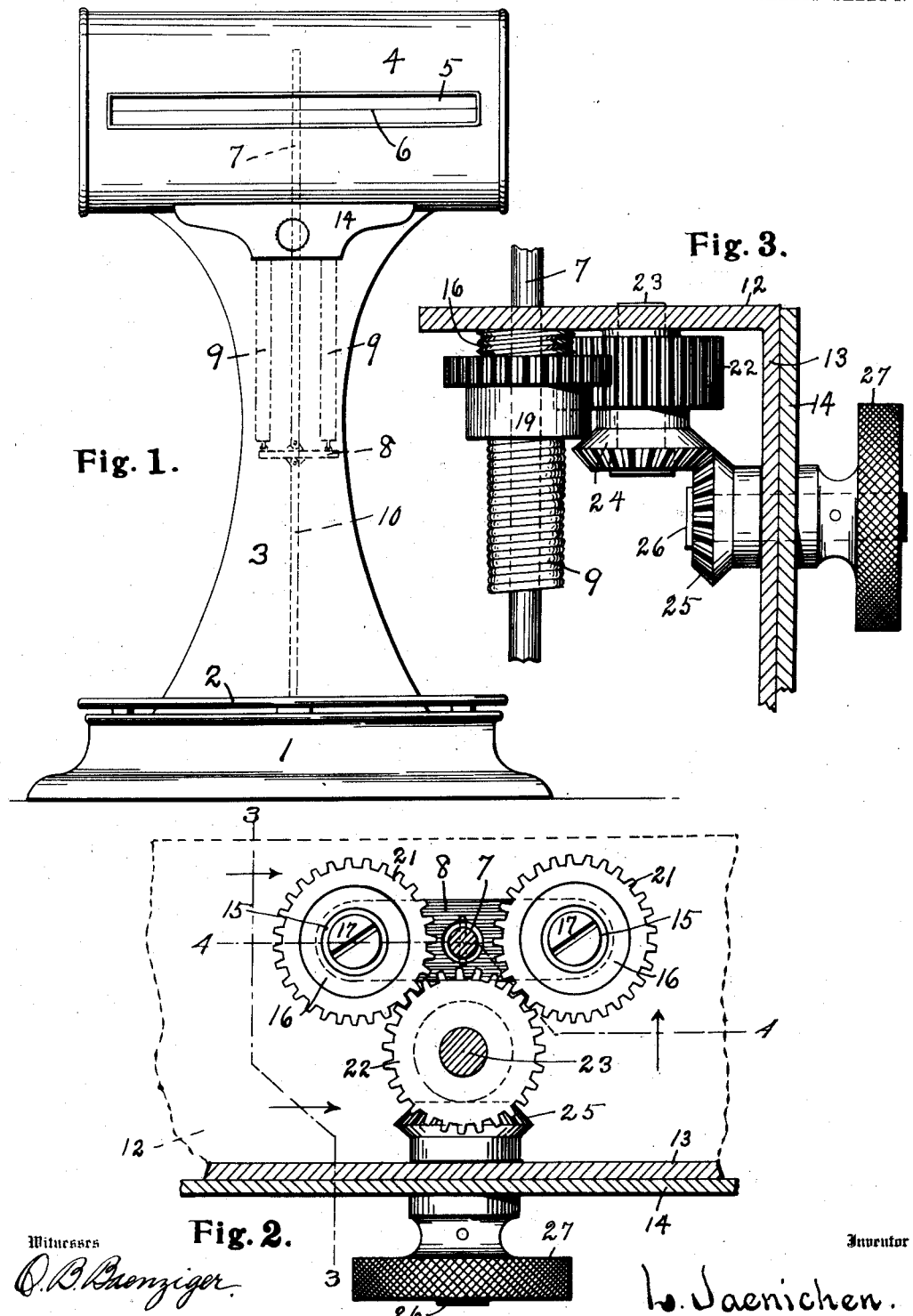

978,026.

Patented Dec. 6, 1910.

2 SHEETS—SHEET 2.

UNITED STATES PATENT OFFICE.

LOUIS JAENICHEN, OF DETROIT, MICHIGAN, ASSIGNOR TO STANDARD COMPUTING SCALE COMPANY, LIMITED, OF DETROIT, MICHIGAN, A LIMITED PARTNERSHIP OF MICHIGAN.

SPRING-SCALE.

978,026.   Specification of Letters Patent.   Patented Dec. 6, 1910.

Application filed September 18, 1908. Serial No. 453,584.

*To all whom it may concern:*

Be it known that I, LOUIS JAENICHEN, a citizen of the United States, and a resident of Detroit, in the county of Wayne and State of Michigan, have invented a new and Improved Spring-Scale, of which the following is a specification.

My invention consists of means for varying the length of a scale spring and at the same time adjusting the relative positions of the spring support and the weight indicator.

Spiral springs elongate in proportion to the increase in absolute temperature, and for equal loads and dimensions, according to their length. The same spring will therefore elongate more under a given load when at a higher than when at a lower temperature. To insure perfect action of spring scales it is therefore necessary to provide some means to adjust the length of the springs and also the connection between either the springs and their supports or between the springs and the weight indicators. The former is to be preferred.

Figure 4:
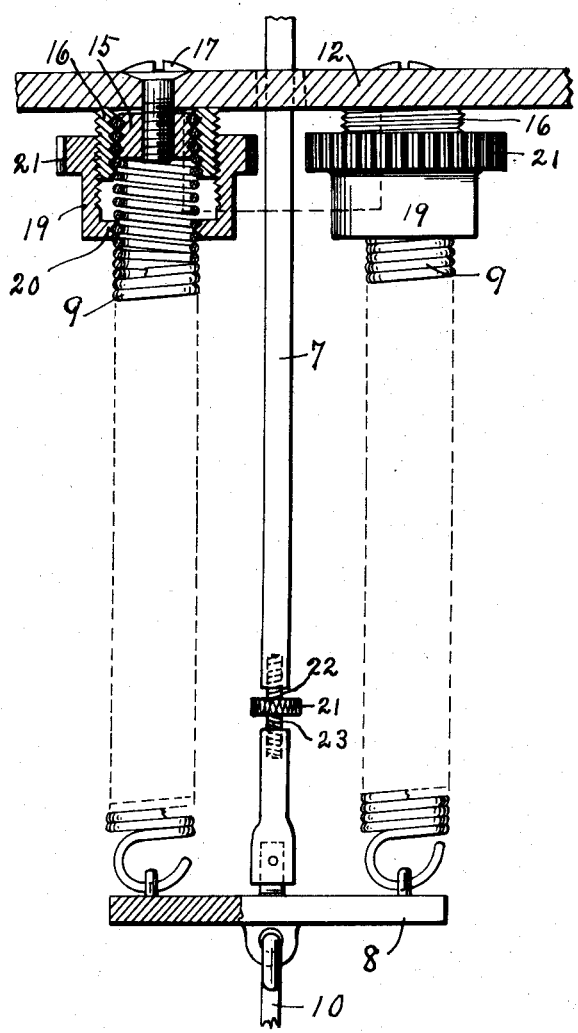
Figure 5:
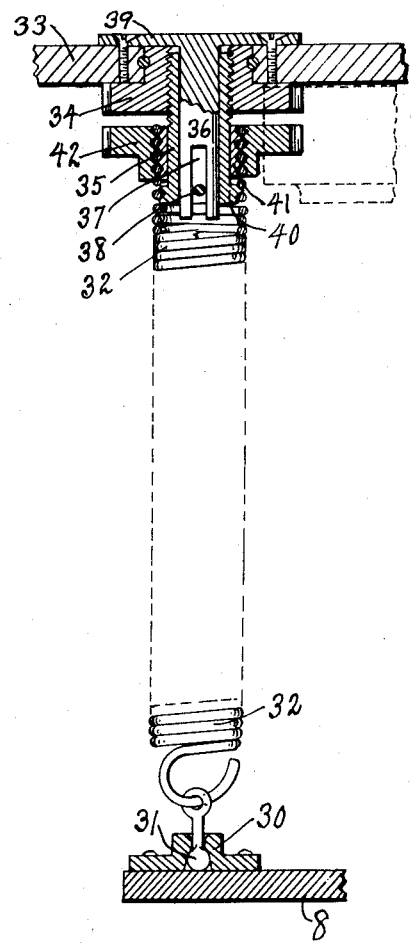

In the accompanying drawings Figure 1 is a front view of one type of spring scale. Fig. 2 is a plan of the adjusting mechanism embodying my invention, the supporting plate being omitted and indicated by dotted lines. Fig. 3 is a cross section on the line 3—3 of Fig. 2. Fig. 4 is a cross section on the line 4—4 of Fig. 2. Fig. 5 is a detail of a modified form of my invention. Similar reference characters refer to like parts throughout the several views.

In the drawings, Fig. 1 represents a common type of spring scale having a base 1, a platform 2, a standard 3, and a cylinder 4 provided with a window 5 through which the figures on the indicating drum may be read. A line 6 or other gage may be drawn on the glass of the window level with the journals of the indicating drum. A rod 7 having any desirable connection with the indicator connects to a cross bar 8 supported by the springs 9. This cross bar connects to the platform levers through a rod 10. The parts thus far enumerated form no part of the present invention.

If all the parts of the scale were of the same material they would expand equally, but by forming the rod 7 which connects the cross bar 8 to the weight indicator of a metal that has a different coefficient of expansion than the remainder of the scale, particularly of the springs, the person using the same will be informed when the scale is not in proper adjustment by the indicator not standing at zero when the scale is unloaded. It is immaterial as to the type of indicator connected to this rod. In the scale shown in the drawings the difference of expansion between the rod 7, usually known as the rack bar, and the combined expansion of a spring 9 and that portion of the drum 4 below the line 6 will determine the variation of the indicator, whether this expansion be positive or negative. The length of the rod 7 may be adjusted by the knurled collar 21 having right and left handed projecting screws 22 and 23 which screw into the ends of the two parts of the rod. It is, above all, necessary when the temperature is above that at which the scale was last adjusted, to shorten the spring.

Mounted in the power part of the drum 4 are the plates 12 and 13 attached together at right angles. To permit examination, the front of the standard is cut away, the opening being closed by the plate 14. The springs 9 are held rigidly between collars 15 and sleeves 16, the screws 17 holding these parts in position as shown in Fig. 4. The threads on the interior of the sleeves and exterior of the collars are of about the same pitch as the springs but fit so loosely that they jam under the pull of the screws 17. A second sleeve 19, having interior threads that mesh with the threads on the sleeve 16 has an interior flange 20 which is screw threaded and screws onto the spring 9. Gear teeth 21 on the outside of each of these second sleeves mesh with a spur gear 22 which is mounted on the pin 23. A bevel gear 24, integral with the spur gear 22 meshes with the bevel gear 25 secured to the stem 26. This stem is journaled in the plates 13 and 14 and has mounted on its outer end any desirable means whereby it may be turned, such as the button or knob 27. It will be obvious that it is desirable but not absolutely necessary to adjust both springs simultaneously, and that any other mechanism besides the gear 22 and the mechanism connected thereto may be employed.

The operation of the mechanism is quite simple. Turning the knob or button 27 will turn both the sleeves 19 in the same direction. This will cause the inner flanges 20 to screw up or down on the springs, increasing or decreasing their operative lengths. While the cross bar 8 has moved away from or toward the zero mark on the scale because of change in temperature, the indicating point on the rod 7 may have moved in relatively the same or in the opposite directions, and the thread on the sleeve 16 must have such pitch and direction that the final movement of the cross bar 8 will bring the indicating portion of the rod to zero position at the same time that the spring has been properly adjusted. Thus where the expansion of the rod 7 is slightly less than that of the spring and its support, the pitch of the thread on the sleeve 16 will be as much less than that of the flange 20 and in the same direction as the spring. A competent scale designer can properly proportion these pitches of threads and their directions to meet various conditions of material and dimensions.

The modified form shown in Fig. 5 is designed to be adjusted in a manner similar to that just described, the pinions on the springs being all in mesh with the same gear. The cross bar 8 is unchanged but carries a bearing 30 for the ball 31 of the swivel at the lower end of the spring 32 which may turn freely. Revolubly mounted in the plate 33, which corresponds to the plate 12 in the other construction, is a gear 34, in whose threaded hub the sleeve 35 is mounted. A stem 36 has a slot 37 in which the pin 38, that is carried by the sleeve 35, may move up and down. The plate 39 integral with the stem 36 is secured to the plate 33 and thus prevents the stem 36 and sleeve 35 from turning but the sleeve is permitted to move up and down. At its lower end the sleeve has a threaded flange 40 which screws into the spring, the pitch of the thread being usually coarser than that on the upper end of the sleeve. A collar 41 is journaled on the sleeve 35 and its exterior is screw threaded. A gear 42 has its bore screw threaded and within it, the upper end of the spring 32 is firmly secured by the collar 41. Both gears 34 and 42 turn together under the operation of the same gear. The operation is as follows. The direction of the threads on the flange 40 and the sleeve 35 will depend upon the relative expansion of the member that connects the cross bar 8 to the indicator, and the correlated parts, and the pitch of these threads will depend upon the ratio of these expansions. When these threads are both right handed, the turning of the gears to the right will raise the cross bar 8 at the rate of the threads on the flange 40 and lower it at the rate of the threads on the sleeve 35. Any desired combinations may be effected by the pitches and directions of these threads.

Having now explained my improvements, what I claim as my invention and desire to secure by Letters Patent is:—

1. In a scale, the combination of a supporting plate, a sleeve having interior and exterior threads, a collar having exterior threads, a coil spring adapted to be rigidly held within the sleeve by the collar, a screw to secure the sleeve and collar to the supporting plate, a second sleeve screwed onto the first and having external gear teeth and an interior threaded flange adapted to engage the coils of the spring, and means to engage the gear teeth to adjust the effective length of the spring.

2. In a scale, the combination of a coil spring, means to secure one end thereof rigidly comprising a threaded sleeve, a second sleeve having its bore threaded to screw onto said first sleeve and having a second portion threaded at a different pitch to engage the coil spring, and means to turn said second sleeve.

3. In a scale, the combination of a coil spring, means comprising a screw-threaded portion to support one end of the spring, and means for operatively engaging both this screw threaded portion and the spring for changing the operative length of the spring.

4. In a scale, the combination of a frame, a screw threaded member rigidly mounted thereon, a coil spring, a sleeve having one screw threaded portion to engage the screw threaded member mounted on the frame and another portion screw threaded at a different pitch to engage the coils of the spring, and toothed gearing to cause a relative movement between the sleeve and the spring to adjust the operative length of the latter.

5. In a scale, the combination of a frame, a screw threaded member extending down from the same, a coil spring, a sleeve having a screw threaded portion at its lower end to engage the coil of the spring and at its upper end to engage the screw threaded member mounted on the frame, and toothed gearing to cause a relative rotary movement between the sleeve and the spring to adjust them longitudinally relative to each other and at the same time cause similar longitudinal movement between the frame and the spring.

6. In a scale, the combination of a frame, a stationary threaded sleeve mounted thereon, a weight indicator, a spring, a connection between the indicator and spring, and an internally, differentially-threaded member engaging the sleeve and spring.

7. An adjusting device comprising a spring 9, a threaded sleeve 16, a second sleeve 19 screw threaded to fit the spring and the sleeve 16, means for rigidly holding the sleeve 16 and means for rotating the sleeve 19.

8. In an adjusting device, the combination of a collar 15, a sleeve 16, a screw 17, and a spring 9 securely held between the sleeve and collar by the screw, together with a sleeve 19 adapted to screw on the sleeve 16 and the spring whereby the effective length of the spring is varied.

9. The combination of a spring 9, a collar 15, and a sleeve 16, together with means for moving the collar and sleeve longitudinally relative to each other in order to firmly grip the spring.

In testimony whereof, I have signed this specification in the presence of two subscribing witnesses.

LOUIS JAENICHEN.

Witnesses:
  EDWARD N. PAGELSEN,
  ELIZABETH M. BROWN.